US012179682B2

(12) United States Patent
Fischer et al.

(10) Patent No.: US 12,179,682 B2
(45) Date of Patent: Dec. 31, 2024

(54) BIASED BAG WRAP FOR RIMLESS STEERING WHEEL

(71) Applicants: ZF PASSIVE SAFETY SYSTEMS US INC., Washington, MI (US); TESLA, INC., Austin, TX (US)

(72) Inventors: Kurt Fischer, Rochester, MI (US); Aditya Mohanty, Rochester Hills, MI (US); Clark Trusty, Chesterfield, MI (US); Christopher Baucher, Washington, MI (US); Miguel Carlon, Los Gatos, CA (US); Scott Bentley, Pleasanton, CA (US)

(73) Assignees: ZF PASSIVE SAFETY SYSTEMS US INC., Washington, MI (US); TESLA, INC., Austin, TX (US)

(*) Notice: Subject to any disclaimer, the term of this patent is extended or adjusted under 35 U.S.C. 154(b) by 0 days.

(21) Appl. No.: 18/687,455

(22) PCT Filed: Sep. 2, 2021

(86) PCT No.: PCT/US2021/048783
§ 371 (c)(1),
(2) Date: Feb. 28, 2024

(87) PCT Pub. No.: WO2023/033824
PCT Pub. Date: Sep. 3, 2023

(65) Prior Publication Data
US 2024/0351546 A1    Oct. 24, 2024

(51) Int. Cl.
*B60R 21/203* (2006.01)
*B60R 21/201* (2011.01)
*B60R 21/2165* (2011.01)

(52) U.S. Cl.
CPC .......... *B60R 21/203* (2013.01); *B60R 21/201* (2013.01); *B60R 21/21656* (2013.01)

(58) Field of Classification Search
CPC ................ B60R 21/203; B60R 21/201; B60R 21/21656
See application file for complete search history.

(56) References Cited

U.S. PATENT DOCUMENTS

| 5,004,266 A | 4/1991 | Miller et al. |
| 5,240,283 A * | 8/1993 | Kishi .................... B60R 21/233 280/743.1 |

(Continued)

FOREIGN PATENT DOCUMENTS

| EP | 3939859 A1 | 1/2022 | |
| KR | 19980047168 U * | 12/1996 | ............... B62D 1/11 |

OTHER PUBLICATIONS

PCT Search Report for corresponding International Application Serial No. PCT/US2021/048783, dated Apr. 4, 2022, pp. 1-9.

*Primary Examiner* — Faye M Fleming
(74) *Attorney, Agent, or Firm* — Tarolli, Sundheim, Covell & Tummino LLP

(57) ABSTRACT

An apparatus for helping to protect a driver side occupant of a vehicle having a steering yoke includes an airbag mounted to the steering yoke. The airbag is inflatable from a stored condition concealed in the steering yoke to a deployed condition in which the airbag is positioned between the steering yoke and the occupant. The apparatus also includes an airbag wrap for packaging the airbag in the stored condition. The airbag wrap is configured to bias the airbag to deploy initially in an initial deployment direction transverse to a steering axis of the steering yoke through a deployment opening defined by the airbag wrap and a pleat formed in the airbag wrap and secured with a tear stitch. The pleat is configured to initially reduce the size of the deployment opening, which limits initial deployment of the airbag through the deployment opening. The pleat is further configured to rupture in response to increasing airbag deploy- (Continued)

ment forces to increase the size of the deployment opening for further deployment of the airbag therethrough.

26 Claims, 7 Drawing Sheets

(56) References Cited

U.S. PATENT DOCUMENTS

| | | | | |
|---|---|---|---|---|
| 6,131,944 | A | 10/2000 | Henkel et al. | |
| 6,419,262 | B1 * | 7/2002 | Fendt | B60R 21/231 |
| | | | | 280/743.1 |
| 9,676,355 | B2 * | 6/2017 | Kruse | B60R 21/233 |
| 9,845,067 | B2 * | 12/2017 | Morris | B60R 21/233 |
| 10,723,300 | B2 * | 7/2020 | Faruque | B60R 21/2338 |
| 10,836,343 | B2 * | 11/2020 | Nakajima | B60R 21/205 |
| 10,864,883 | B2 * | 12/2020 | Yanagisawa | B60R 21/237 |
| 10,875,484 | B2 * | 12/2020 | Nakajima | B60R 21/203 |
| 11,938,881 | B2 * | 3/2024 | Kwon | B60R 21/276 |
| 2011/0148083 | A1 * | 6/2011 | Paxton | B60R 21/2346 |
| | | | | 280/736 |
| 2021/0001797 | A1 | 1/2021 | Osterfeld | |

* cited by examiner

BIASED BAG WRAP FOR RIMLESS STEERING WHEEL

RELATED APPLICATIONS

This application is a U.S. National Stage Application filed under 35 USC 371, claiming priority to Serial No. PCT/US2021/048783, filed on 2 Sep. 2021, the entirety of which is hereby incorporated herein by reference.

TECHNICAL FIELD

This disclosure relates to an apparatus for helping to protect an occupant of a vehicle upon the occurrence of an event, such as a vehicle collision. In particular, the present invention relates to a driver airbag module configured to be mounted on a vehicle steering wheel.

BACKGROUND

The automobile industry is trending toward vehicles with autonomous driving features, with purely autonomous, i.e., "driverless" vehicles on the horizon. This being the case, driver controls are evolving along with this trend. As automation increasingly takes over the driving function, the need for traditional driver controls changes and/or becomes diminished.

One area in which the driver controls are evolving is the steering wheel. As the prevalence of automated driving functions increases, the need to include a steering wheel in the vehicle remains, even though its use may be diminished. As a result, the steering wheel can be designed to have less of a presence within the passenger compartment. One example of such a design is a steering wheel with a partial rim design where the upper portion and, perhaps a lower portion, of the steering wheel rim is removed. This configuration is sometimes referred to as a steering yoke configuration.

Conventional steering wheel mounted driver frontal airbags, however, can rely on the traditional circular full-rim configuration for several reasons. For example, traditional frontal airbags can have a generally round, pillow shaped configuration, and can rely on the steering wheel rim to act as a reaction surface for the airbag when deployed. Since the yoke steering wheel omits the upper portions of the traditional steering wheel rim, the configuration of the driver frontal airbag can require a design that accounts for this omission.

Additionally, out of position (OOP) occupants can be leaned forward with their head against the steering wheel. With traditional circular full-rim steering wheel configurations the occupant's head engages the upper portion of the steering wheel rim, which blocks the head from further forward (in the vehicle) movement. The yoke steering wheel omits the upper rim portion of the steering wheel, and therefore permits the OOP occupant to move further forward in the vehicle.

SUMMARY

A driver airbag module is configured for implementation on a steering wheel that omits an upper portion of the traditionally circular steering wheel rim. A non-limiting example of such a steering wheel configuration is what can be referred to as a yoke steering wheel. The driver airbag module can be implemented in any steering wheel that lacks the conventional upper steering wheel rim portion or has a configuration that is equivalent thereto.

According to one aspect, an apparatus for helping to protect a driver side occupant of a vehicle having a steering wheel includes an airbag mounted to the steering wheel. The airbag is inflatable from a stored condition concealed in the steering wheel to a deployed condition in which the airbag is positioned between the steering wheel and the occupant. The apparatus also includes an airbag wrap for packaging the airbag in the stored condition. The airbag wrap is configured to bias the airbag to deploy initially in an initial deployment direction transverse to a steering axis of the steering wheel through a deployment opening defined by the airbag wrap and a pleat formed in the airbag wrap and secured with a tear stitch. The pleat is configured to initially reduce the size of the deployment opening, which limits initial deployment of the airbag through the deployment opening. The pleat is further configured to rupture in response to increasing airbag deployment forces to increase the size of the deployment opening for further deployment of the airbag therethrough.

According to another aspect, the airbag wrap can be further configured to restrict airbag movement in directions other than the initial deployment direction so that the airbag wrap biases the airbag to deploy through the deployment opening in the initial deployment direction.

According to another aspect, the airbag wrap can be configured so that the deployment opening is at least partially defined by an edge of the wrap configured to distribute at least a portion of initial airbag deployment forces away from an edge of a cover behind which the airbag and airbag wrap are stored. The edge of the wrap can include a scalloped edge. The scalloped edge can include an edge that is curved inward toward a center portion of the cover.

According to another aspect, the airbag and airbag wrap can be components of an airbag module. The airbag module can also include an inflator for inflating the airbag, and a retainer to which the inflator, airbag, and airbag wrap are secured. The retainer can be configured to be connected to the steering wheel to mount the airbag module on the steering wheel. The airbag module can be a component of a vehicle safety system.

According to another aspect, the airbag wrap can include a central portion configured to cover the airbag. The airbag wrap can also include a first wrap portion that extends from the central portion in a first direction, wraps around the airbag, inflator, and retainer, and is secured to a rear of the retainer. The airbag wrap can also include a second wrap portion that extends from the central portion in a second direction, opposite the first direction, wraps around the airbag, inflator, and retainer, and is secured to the rear of the retainer. The airbag wrap can further include a third wrap portion that extends from the central portion in a third direction, transverse to both the first and second directions, wraps around the airbag, inflator, and retainer, and is secured to the rear of the retainer. The third direction can be opposite the initial deployment direction.

According to another aspect, the airbag wrap can be configured to package the airbag in a folded condition and to define a deployment opening facing in the initial deployment direction. The airbag wrap can be further configured to restrict airbag movement in directions other than the initial deployment direction so that the airbag wrap biases the airbag to deploy through the deployment opening in the initial deployment direction.

According to another aspect, the central portion and the first, second, and third wrap portions can define the deployment opening and restrict airbag movement in directions other than the initial deployment direction due to their respective connections to the rear of the retainer.

According to another aspect, the second wrap portion can be folded to form the pleat. The tear stitching can extend through the pleat and connect the folded portions of the second wrap portion to the central portion.

According to another aspect, the apparatus can also include fastener studs that extend through the retainer and fastener receiving openings in end portions of the first, second, and third wrap portions to secure the first, second, and third wrap portions to the retainer. The fastener studs can also secure the airbag and the inflator to the retainer.

According to another aspect, the airbag can have a generally circular, pillow shaped configuration, and the normally deployed position of the airbag can be generally centered on the steering axis.

According to another aspect, the steering wheel can have a steering yoke configuration.

According to another aspect, the initial deployment direction can be configured to be a lateral direction with respect to the vehicle.

According to another aspect, the initial deployment direction can be configured to be a laterally inboard direction with respect to the vehicle.

According to another aspect, the initial deployment direction can be configured to be lateral of an area on the steering wheel where an out-of-position occupant's head can rest.

According to another aspect, the airbag can be configured so that deployment in the initial deployment direction directs deployment energy of the airbag away from an area on the steering wheel where an out-of-position occupant's head can rest.

According to another aspect, the airbag can be configured so that deployment in the initial deployment direction causes an initially low deployment energy to be applied to the OOP occupant's head, causing an initial low energy movement of the OOP occupant's head away from the steering wheel.

According to another aspect, the airbag can be configured so that the airbag's movement back toward the steering axis to the normally deployed condition further moves the OOP occupant's head away from the steering wheel after the initial deployment energy is expended.

BRIEF DESCRIPTION OF THE DRAWINGS

The foregoing and other features will become apparent to one skilled in the art to which this disclosure relates upon consideration of the following description with reference to the accompanying drawings, in which.

DETAILED DESCRIPTION

Safety System Overview

Figure 1:
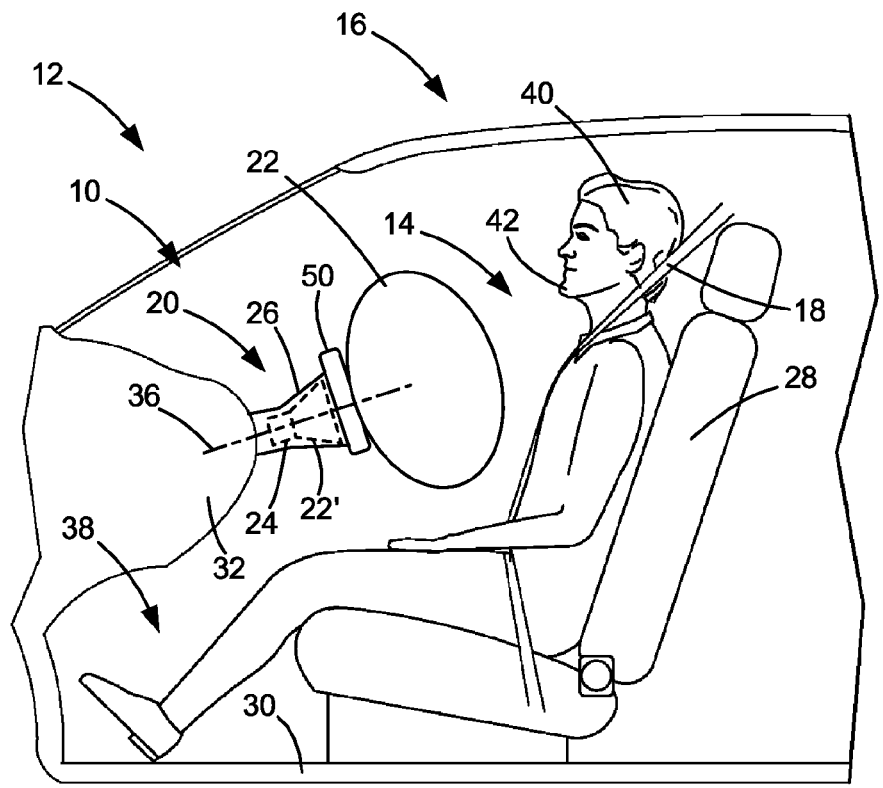
FIG. 1 illustrates schematically a vehicle including an apparatus for helping to protect a vehicle occupant, according to an example configuration.

FIG. 1 illustrates an example configuration of an apparatus 10 for helping to protect an occupant 14 of a vehicle 12. In this description, the occupant 14 is an operator or driver of the vehicle, and these designations can be used interchangeably. The apparatus 10 includes a driver front airbag module 20 configured to be mounted on a steering yoke 50 on a driver side 16 of the vehicle 12. The vehicle 12 also includes a seatbelt 18 for helping to restrain the occupant 14 in a vehicle seat 28.

The airbag module 20 includes an airbag 22, an inflation fluid source 24, such as an inflator, and a structure 26, such as a housing, for supporting the airbag 22 and inflator 24 in the vehicle 12. The airbag has a stored condition, indicated generally in dashed lines at 22', in which the airbag is deflated, folded, and stored in the housing 26. The housing 26 may include a cover 64 (see FIG. 2) that helps conceal the airbag 22 in the steering yoke 50 while in the stored condition.

The inflator 24 is actuatable to inflate the airbag from the stored condition to a deployed condition illustrated generally in solid lines at 22. When the inflator 24 is actuated, the cover moves from a closed condition helping to conceal the airbag 22 in the housing 26 to an open condition allowing the airbag to inflate and deploy from the housing.

The airbag 22 inflates and deploys in a direction away from the steering yoke 50 and generally parallel to a steering axis 36 of the vehicle 12. In the deployed condition, the airbag 22 is positioned between the occupant 14 and the steering yoke 50 and between the occupant and an instrument panel 32 on the driver side 16 of the vehicle 12. The airbag 22, when in the deployed condition, helps absorb the forces of impacts with the airbag and helps distribute the impact forces throughout the airbag in order to cushion the occupant and provide a desired ride-down effect.

Safety Standards

The National Highway Traffic Safety Administration ("NHTSA") is a U.S. government agency that governs vehicle safety and assesses new car safety via its New Car Assessment Program (US-NCAP). Through US-NCAP, NHTSA establishes crash tests to establish the crashworthiness of new vehicles and rates those vehicles with a star rating, with a five-star rating being the best. NHTSA has also established the Federal Motor Vehicle Safety Standards (FMVSS), which NHTSA issues to make sure a vehicle sold in the US meets a variety of safety criteria (pass/fail). The FMVSS standards describe in detail the precise test procedures, which are determined from metrics measured for crash test dummies positioned in the vehicle at the time of the test.

The U.S. is not the only country to have its own new car assessment program. Other countries, such as China, Japan, and Australia, and other groups of countries, such as Europe and Latin America, have their own New Car Assessment Programs. While the new car ratings issued by these bodies are similar, some utilize crash tests with slightly different methods.

One particular area crash scenario for which NHTSA establishes standards is referred to as Out-Of-Position (OOP) occupant scenarios. OOP occupant scenarios are those associated with the occupant being away from a normally seated position in the vehicle at the time of a vehicle crash. In some OOP scenarios, the occupant might be positioned abnormally close to a safety device, such as an airbag. To help account for this possibility, NHTSA has established standards for testing vehicle and safety system performance in certain ones of these OOP scenarios, with the goal of maintaining occupant protection while accounting for the possibility of an OOP occupant.

One particular OOP scenario for which NHTSA establishes standards is that of an OOP vehicle driver that is leaned forward with his or her head positioned against the steering yoke rim and his or her chin against steering yoke structure on or adjacent the airbag module 20. This can occur, for example, where the occupant falls asleep or where the driver is leaned forward attempting to retrieve an item from the floor 30 or footwell 38 of the vehicle 12. If a crash occurs during this scenario, the occupant's head 40 can be positioned abnormally close to the airbag module 20 when the airbag 22 is deployed.

Because of this, NHTSA has included in the Federal Motor Vehicle Safety Standards a test for evaluating the performance of steering yoke mounted airbag modules in an OOP scenario where the occupant's head is positioned with his or her chin 42 on the airbag module 20 at the time of deployment. By "on the airbag module," it is meant that the occupant's chin is positioned according to the specified testing procedures to be against or as close as possible to a prescribed location on the steering yoke structure relative to the airbag module 20.

NHTSA's Federal Vehicle Safety Standards are codified in the Code of Federal Regulations at 49 C.F.R. § 571.208, commonly referred to as FMVSS208, the text of which is publicly available and is hereby incorporated by reference in its entirety. FMVSS208 S26 defines procedures for low risk deployment tests of driver airbags. Test procedure 26.2 defines a test procedure for an OOP driver with their chin positioned on the airbag module, referred to herein as a chin-on-module test. This test is performed with what is referred to as a 5% female crash test dummy, meaning that the dummy is modeled after a statistical female having a height and weight equal to or greater than only 5% of the female population. This statistical person can be referred to as a $5^{th}$ percentile female or small female occupant.

Steering Yoke Configuration

Figure 2:
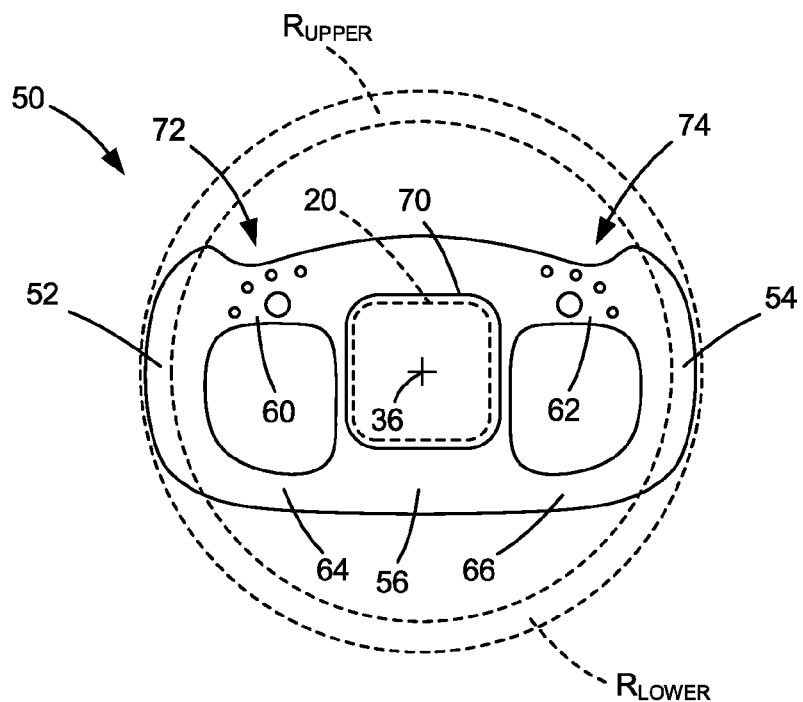
FIG. 2 is a schematic plan view of a steering wheel implemented in the vehicle of FIG. 1.

FIG. 2 is a schematic illustration of the steering yoke 50. As shown in FIG. 2, the steering yoke 50 has a shape that departs from the round/circular shape that is typical of conventional steering wheel configurations. For purposes of comparison, FIG. 2 illustrates in dashed lines a conventional steering wheel rim R having this conventional round/circular configuration. As shown, the steering yoke 50 omits conventional upper and lower portions of the conventional rim R, identified generally at $R_{UPPER}$ and $R_{LOWER}$, respectively.

The steering yoke 50 resembles the type of controller commonly found in the aviation field. The configuration of the steering yoke 50 illustrated in FIG. 2, however, is neither limiting nor exhaustive of the type of steering yoke for which the apparatus 10 can be implemented. The apparatus 10 can be implemented in a steering yoke having any configuration that omits all or a portion of the conventional steering wheel rim, especially the upper portion $R_{UPPER}$.

The steering yoke 50 includes left and right rim portions 52, 54, respectively, and a hub portion 56 through which the steering axis 36 extends. Cross-members or spokes 60, 62, 64, and 66 connect the left and right rim portions 52, 54 to the hub portion 56. The vehicle driver 14 can grasp the rim portions 52, 54 to effectuate steering of the vehicle 12. As shown in FIG. 2, the steering yoke 50 can include various operator control devices 72 and 74, such as switches, buttons, knobs, etc., for controlling vehicle systems, such as information/entertainment ("infotainment") systems and communication systems, such as hands-free cell phone control systems.

As shown in FIG. 2, the airbag module 20 can be mounted on the steering yoke 50 and housed beneath a skin or cover 70, which opens during airbag deployment. The cover 64 can open, for example, via a tear seam that ruptures under the inflation and deployment forces of the airbag 22. The airbag 22, when inflated, has a generally round configuration and can be generally centered on the steering axis 36. The phrase "generally centered," is meant to account for the fact that the airbag module 20 and the airbag 22 reside in the hub portion 56, and the steering axis 36 passes through the hub, but the airbag/airbag module and/or the steering axis might not be centered precisely on that axis. Thus, while the steering axis 36 and the center of the airbag module 20 and/or the airbag 22 itself, they are at least closely spaced and aligned vertically when the steering yoke 50 is at the "steering straight forward" position illustrated the figures. As a result, when the airbag 22 is inflated, deployed, and positioned normally, it is generally centered on the steering axis 36.

Because the steering yoke 50 has the aforementioned steering yoke configuration, an OOP occupant leaned forward against the steering yoke would not have their head movement limited by engagement with the upper rim portion (see FIG. 2). The OOP occupant could, for example, be leaned forward with their chin engaging the cover 64 of the airbag module 20 directly. Advantageously, the airbag module 20 is configured to improve its performance in the FMVSS208 S26.2 chin-on-module test despite this lack of an upper rim portion. The construction of the airbag module 20 that facilitates chin-on-module performance is illustrated in FIG. 3.

Airbag Module

Figure 3:
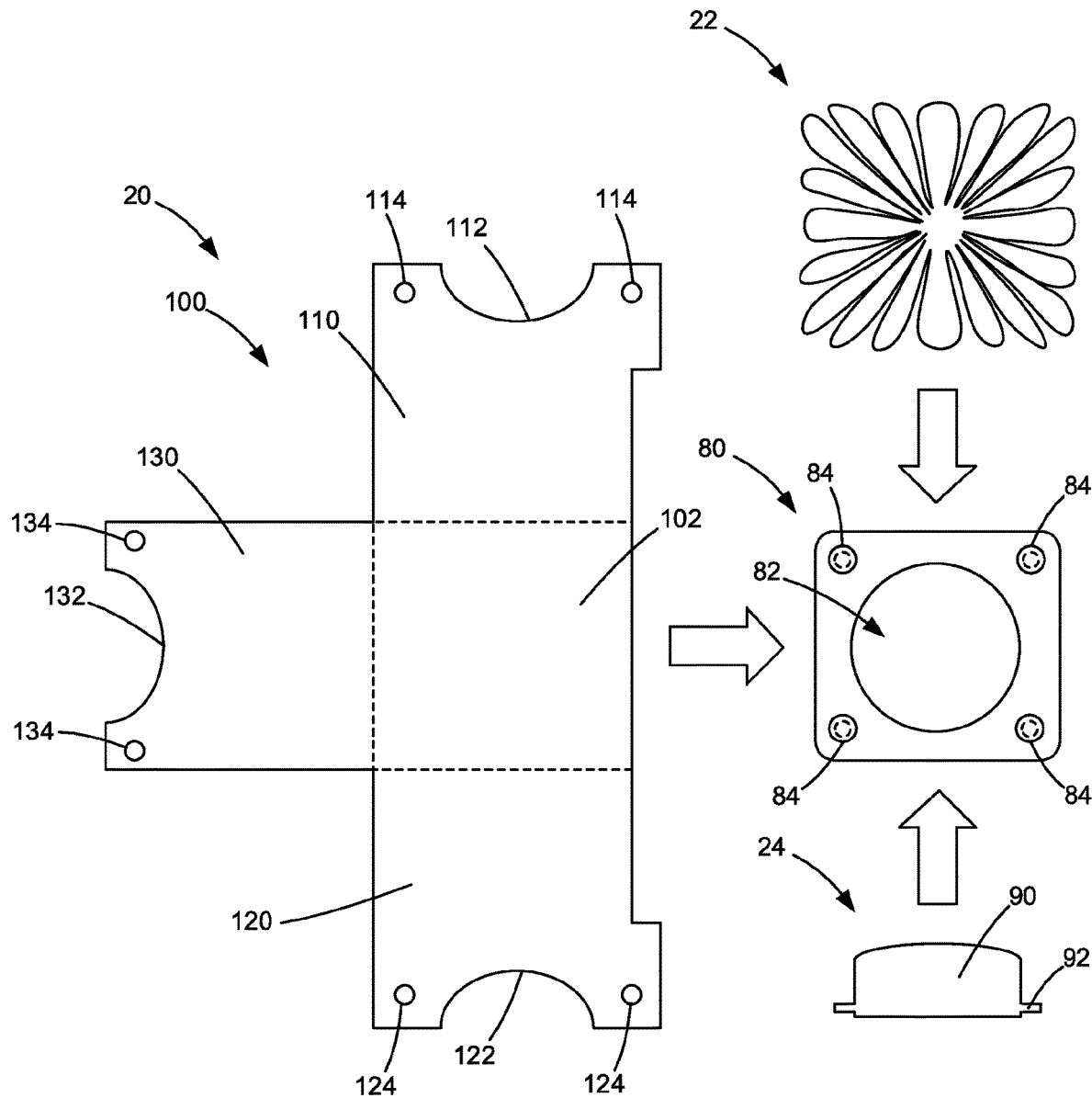
FIG. 3 is a schematic view illustrating components of an airbag module portion of the apparatus.

Referring to FIG. 3, the airbag module 20, which is shown schematically and unassembled, includes four basic components: the airbag 22, the inflator 24, an airbag retainer 80, and an airbag wrap 100. The airbag module 20 can include additional components, which are not important to the chin-on-module performance and are omitted for purposes of clarity.

Figure 4:
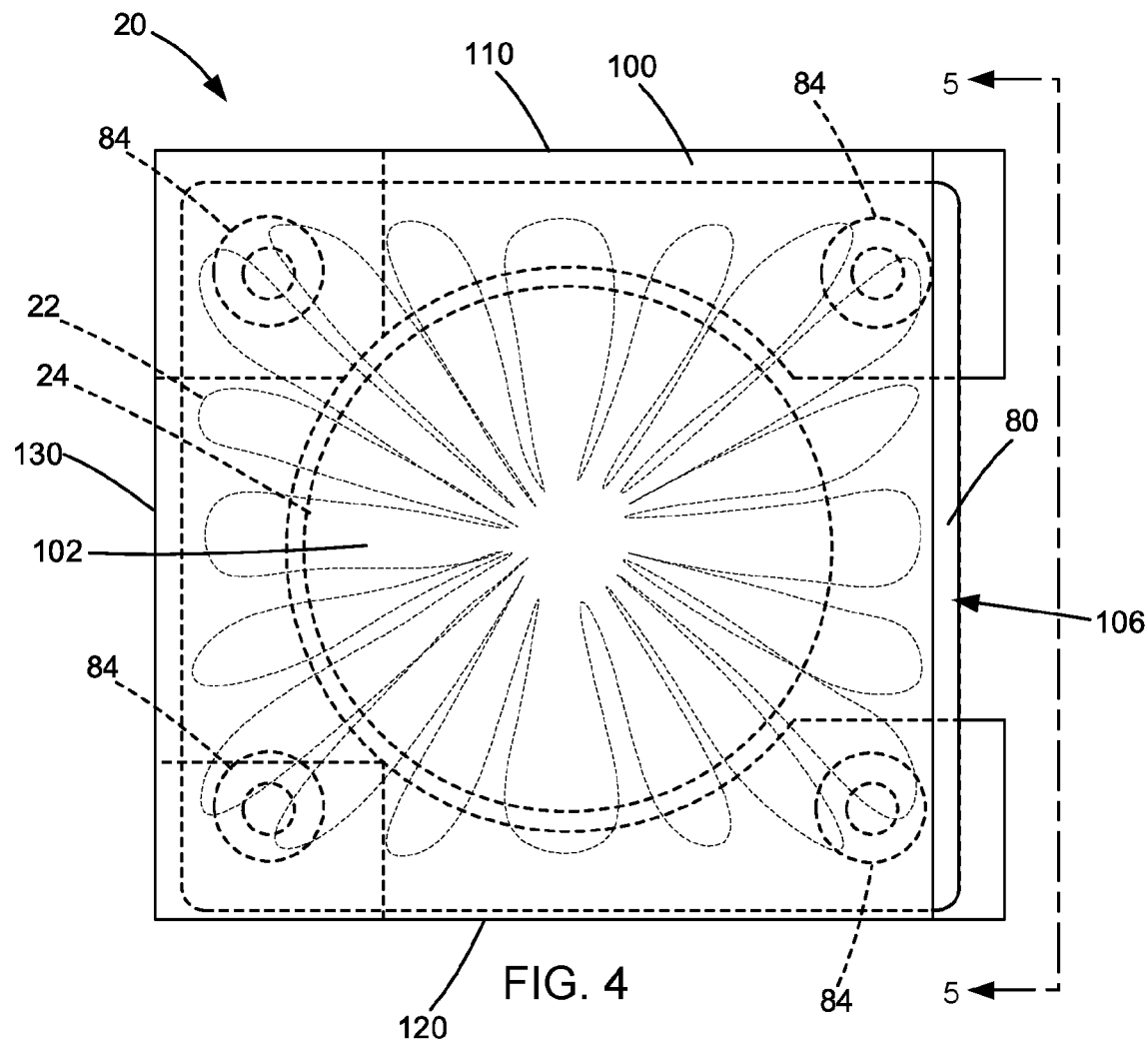
FIG. 4 is a top view of the airbag module in an assembled condition.
Figure 5:
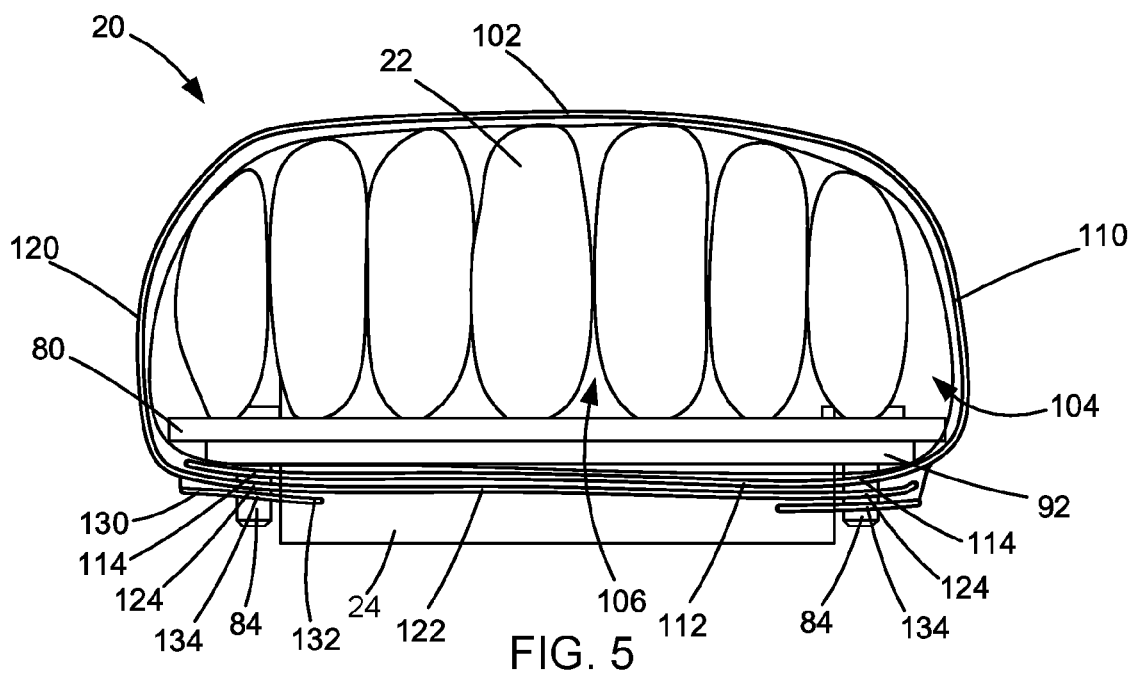
FIG. 5 is a side view of the airbag module in an assembled condition.

Assembly of the air bag module 20 is indicated generally by the arrows in FIG. 3, and places the module in the assembled condition of FIGS. 4 and 5. Essentially, the inflator 24 is assembled with the retainer 80 by passing the inflator housing 90 through a central retainer opening 82 so that an inflator rim portion 92 engages the retainer. Fastener studs 84 pass through aligned openings in the retainer 80 and inflator 24.

The airbag 22 is positioned with a mouth portion (not shown) positioned over the retainer 80 and inflator 24, with the fastener studs 84 passing through fastener openings adjacent the mouth portion. The airbag 22 is folded in a desired manner, such as the illustrated star-fold configuration. The airbag wrap 100 has a generally T-shaped configuration. The airbag wrap 100 is installed by positioning a central portion 102 of the wrap on top of the folded airbag 22. By "on top" of the folded airbag, it is meant that the central portion 102 covers the surface of the folded airbag 22 facing generally along the steering axis 36 toward the occupant. In other words, the upper portion 102 is positioned between the airbag 22 and the occupant 14 when the airbag module 20 is installed in the steering yoke 50 and prior to airbag deployment. Then, a first or upper wrap or wrap portion 110, a second or lower wrap or wrap portion 120, and third or side wrap or wrap portion 130 are wrapped around the folded airbag 22, retainer 80, and inflator 24.

On a rear side of the retainer 80, beneath the assemblage of the airbag 22, inflator 24, and retainer as viewed in FIG. 5, inflator engaging portions 112, 122, 132 of the upper, lower, and side wraps 110, 120, 130 are positioned at or engaging a cylindrical portion of the inflator 24. Fastener openings 114, 124, 134 are positioned over respective pairs of the fastener studs 84. This connects the upper, lower, and side wraps 110, 120, 130 to the rear of the retainer. Fasteners (not shown), such as nuts, are threaded onto the studs 84 to complete the assembly of the airbag module 20.

The order in which these steps are performed to assemble the airbag 22, inflator 24, and retainer 80 can vary. For example, the airbag 22 and/or airbag wrap 100 can be assembled onto the retainer before the inflator 24, and the inflator installed thereafter so that the inflator rim 92 clamps onto the airbag and wrap material to help secure the airbag. Alternatively, the airbag module 20 can include a clamping plate that fits onto the fastener studs 84 so that the airbag 22, inflator 24, and wrap 100 are clamped between the retainer 80 and the clamping plate. Aside from the airbag wrap 100, the disclosed configuration and assembly of the airbag module components is not critical. It should be appreciated that these components and their respective configurations can depart from that which is illustrated and described herein, as long as the function of the airbag wrap 100, as described herein, is not negatively affected.

Airbag Wrap

The assembled condition of the airbag module 20 is illustrated in FIGS. 4 and 5. From the perspective of the driver looking at the steering yoke 50 from the seated position, i.e., the view of FIG. 2, the central portion 102 of the airbag wrap 100 covers/packages the portion of the folded airbag 22 facing the driver. The side portions 110, 120, 130 extend from the central portion 102 around the module 20 to their respective connections with the fasteners 84. The three wrap portions 110, 120, 130 of the airbag wrap 100 therefore cover/package the folded airbag 22 on three corresponding sides. The first/upper wrap 110 packages an upper portion of the airbag 22 in the folded condition. The second/lower wrap 120 packages a lower portion of the airbag 22 in the folded condition. The third/side wrap 130 packages a side portion of the airbag 22 in the folded condition. Again, the upper, lower, and side portions of the folded airbag 22 are identified with reference to their relative positions when installed in the steering yoke 50 from the driver's perspective of FIG. 2. As such, the side portion of the folded airbag covered/packaged by the third/side wrap 130 is an outboard side portion of the airbag 22.

In the assembled condition of the airbag module 20, the folded airbag 22 is enclosed or packaged in a package space 104 of the airbag module 20. The package space 104 is defined on three sides by the portions 110, 120, 130 of the airbag wrap 100, on a front side (facing the occupant/driver) by the central portion 102 of the airbag wrap, and on a rear side, opposite the front side, by the inflator 24 and retainer 80. The airbag wrap 100 leaves open a deployment opening 106.

FIG. 5 illustrates the packaged configuration of the airbag module 20 from the side perspective indicated generally by the arrows labeled 5-5 in FIG. 4. This view is from inboard of the steering yoke 50 and airbag module 20 looking outboard. From this perspective, it can be seen that the airbag 22 is folded in the star-fold configuration and covered/packaged in the package space 104 of the module 20. In this view, it can be seen that the packaged airbag 22 is not covered/packaged by the airbag wrap 100 on the inboard side. For protection against damage, for example, during installation of the airbag module 20, the airbag 22 could be covered by a protective layer, such as a fabric sheet, configured to tear upon airbag inflation and offer little or no resistance to deployment.

Figure 6A:
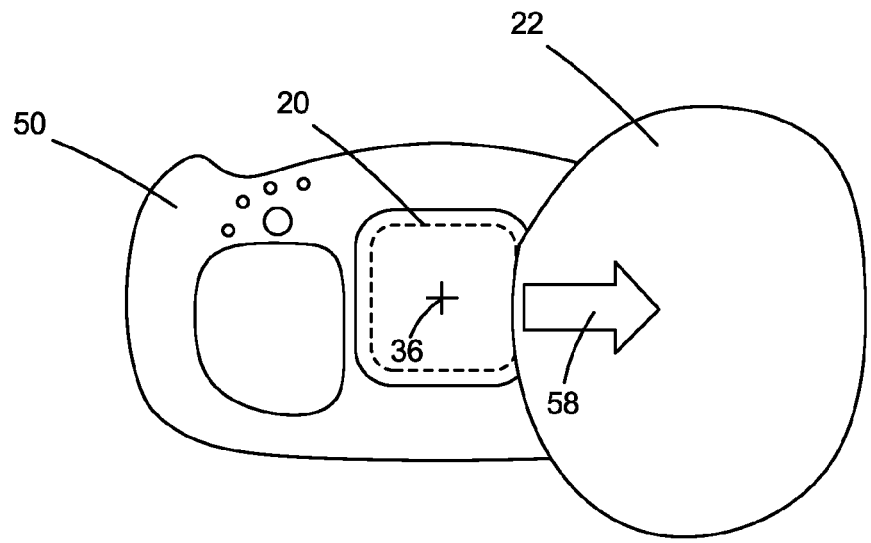
FIGS. 6A-6B are schematic front views illustrating the inflation and deployment of an airbag of the airbag module.
Figure 6B:
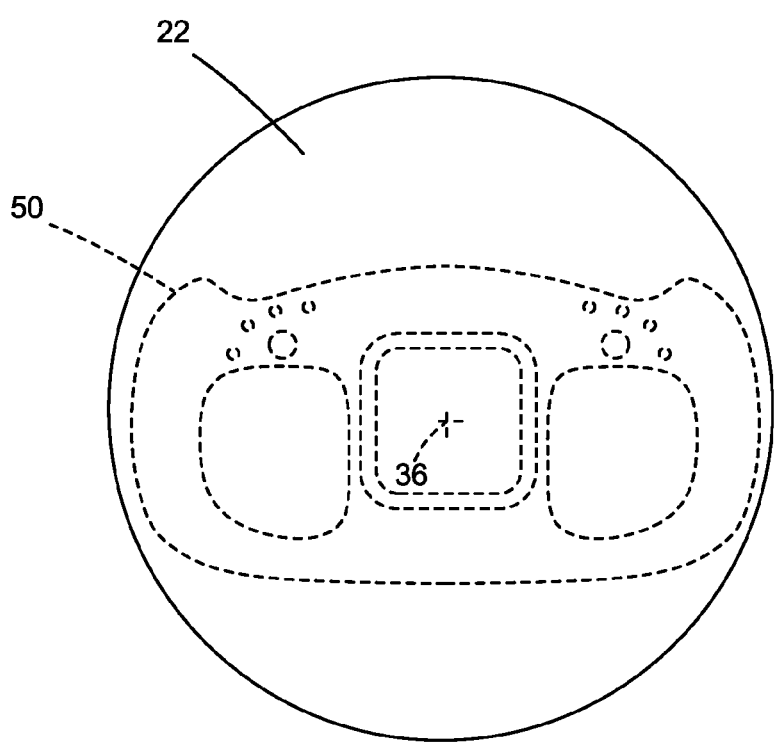

The airbag wrap 100 is configured to bias the deployment of the airbag 100 in order to provide improved performance in crash tests performed according to FMVSS208 S26 procedure 26.2 for an OOP driver with their chin positioned on the airbag module. Referring to FIGS. 6A-6B, the airbag wrap 100 biases the airbag 22 to deploy in an initial deployment direction that is generally transverse with respect to the steering axis 36. In the example configuration illustrated in the figures, the generally transverse direction can be generally perpendicular to the steering axis 36. This direction can, for example, be generally along or parallel to a steering plane in which the steering yoke 50 rotates, and toward one of the steering yoke rim portions 52, 54. To help improve airbag performance in this chin-on-module test, the airbag deployment bias applied by the airbag wrap 100 causes the airbag 22 to deploy in a generally transverse direction that is lateral of the package space 104 through the deployment opening 106 in an inboard direction during the initial stages of inflation. This is shown generally by the arrow 58 indicating lateral deployment in FIG. 6A.

As inflation continues, the airbag 22 continues to deploy outside the package space 104, laterally inboard of the airbag module 20, as directed by the bias applied by the airbag wrap 100. As a continually larger portion of the airbag 22 moves out of the package space 104, the bias applied by the airbag wrap 100 diminishes. When the airbag 22 reaches a certain point or stage of inflation outside the package space 104, the airbag wrap 100 loses its ability to bias its deployment because a substantial portion of the airbag has moved through the deployment opening 106 and outside the package space 104. As a result, there is no airbag structure left in the package space 104 to support the airbag wrap 100.

When the airbag 22 is positioned substantially outside the package space 104, the inflating airbag exerts deployment forces on the airbag wrap from outside the package space, which causes the airbag wrap 100 to collapse. With the airbag wrap 100 no longer biasing the airbag 22 and collapsing as the airbag continues to inflate and pressurize, the unbiased airbag is freed to move according to its predetermined shape in response to pressurization. As a result, the airbag 22 moves in a direction generally opposite the initial deployment direction, to the fully inflated, deployed, and normally positioned condition shown in FIG. 6B.

Figure 7A:
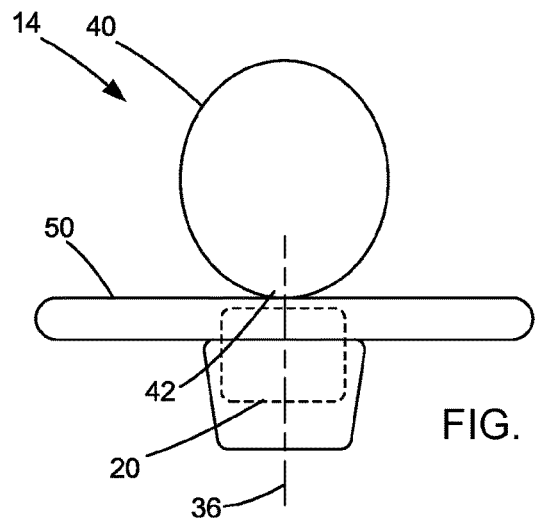
FIGS. 7A-7B are schematic top views illustrating the inflation and deployment of an airbag of the airbag module.
Figure 7B:
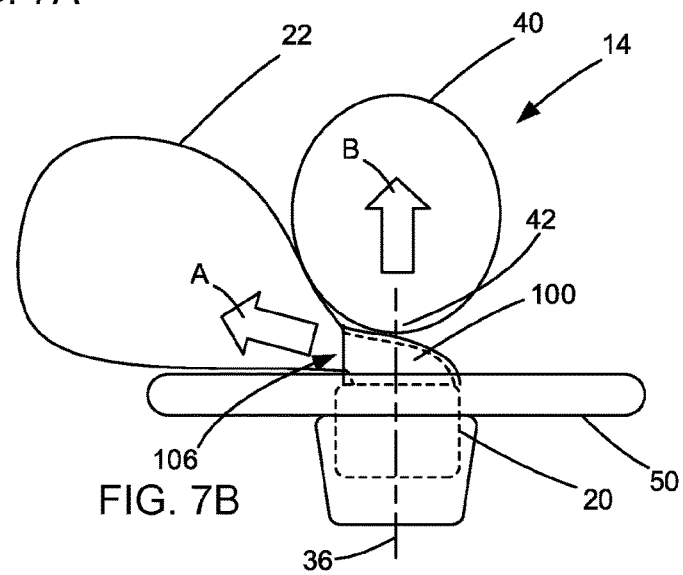
Figure 7C:
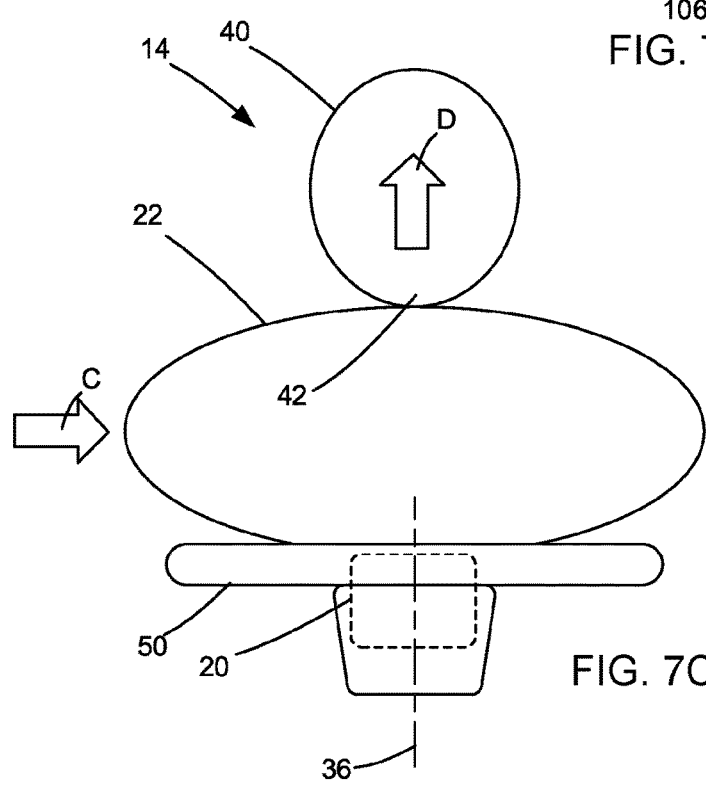

Advantageously, the deployment trajectory imparted to the airbag 22 by the airbag wrap 100 can help improve airbag performance in the FMVSS chin-on-module test. This is shown in FIGS. 7A-C, which are schematic top views depicting the occupant 14, steering yoke 50, and airbag module 20. As shown in FIG. 7A, the occupant 14 is out of position (OOP) with the head 40 at the steering yoke 50 and the chin 42 on the module 20.

As shown in FIG. 7B, When the airbag 22 initially deploys, the airbag wrap 100 biases the airbag 22 to deploy laterally in an inboard direction, as indicated generally by the arrow labeled A in FIG. 7B. As shown in FIG. 7B, this initial laterally inboard deployment can move the occupant's head 40 away from the steering yoke 50 slightly, as indicated generally by the arrow labeled B in FIG. 7B. This initial head movement is slight, however, compared to the degree of movement that would be imparted to the occupant's head were the airbag 22 not biased laterally inboard, and instead directly toward the occupant 14 as is the case with traditional steering yoke mounted driver frontal airbags.

As inflation continues laterally inboard of the airbag module 20, the transfer of deployment energy from the airbag 22 to the occupant 14, particularly the occupant's head 40, is avoided. When the airbag 22 is substantially inflated and the airbag wrap 100 collapses, the airbag moves back toward the normally inflated and deployed condition, as indicated generally by the arrow labeled C in FIG. 7C. This airbag movement causes the occupant's head 40 to move away from the steering yoke 50, as indicated generally by the arrow labeled D in FIG. 7C. The airbag 22 continues to inflate and pressurize, and moves to the fully inflated, deployed, and normally positioned condition shown in FIG. 7C, having greatly reduced the amount of deployment energy transferred to the occupant's head 40, and thereby greatly reducing the chances for head and neck injuries.

In view of the above, it will be appreciated that the inclusion of the airbag wrap 100 in the airbag module 20, and the deployment biasing imparted to the airbag 22 as a result thereof, the vast bulk of the energy used to initially deploy the airbag is not transferred to the occupant's head 40. This is evidenced by the large, laterally inflated/deployed airbag volume positioned inboard of the occupant's head 40, which produces a very small amount of head displacement. Advantageously, the airbag 22 can become substantially inflated laterally inboard of the occupant 14, and can move to the normally inflated and deployed condition of FIG. 7C during the latter stages of deployment, greatly reducing the amount of deployment energy transferred from the airbag 22 to the occupant's head 40. This performance is especially advantageous with the steering yoke 50, which omits an upper rim portion.

Additional Configurations

While the illustrated example airbag module 20 is configured to bias deployment of the airbag 22 laterally inboard, it will be appreciated that an airbag module can be configured to bias deployment of the airbag in any desired direction in the vehicle. For example, the airbag module 20 could be configured to bias airbag deployment laterally outboard, instead of inboard. As another example, the airbag module 20 could be configured to bias airbag deployment upward or downward (as viewed from the occupant perspective of FIGS. 6A-B). As a further example, the airbag module 20 could be configured to bias airbag deployment in any desired perpendicular/lateral direction.

Figure 8:
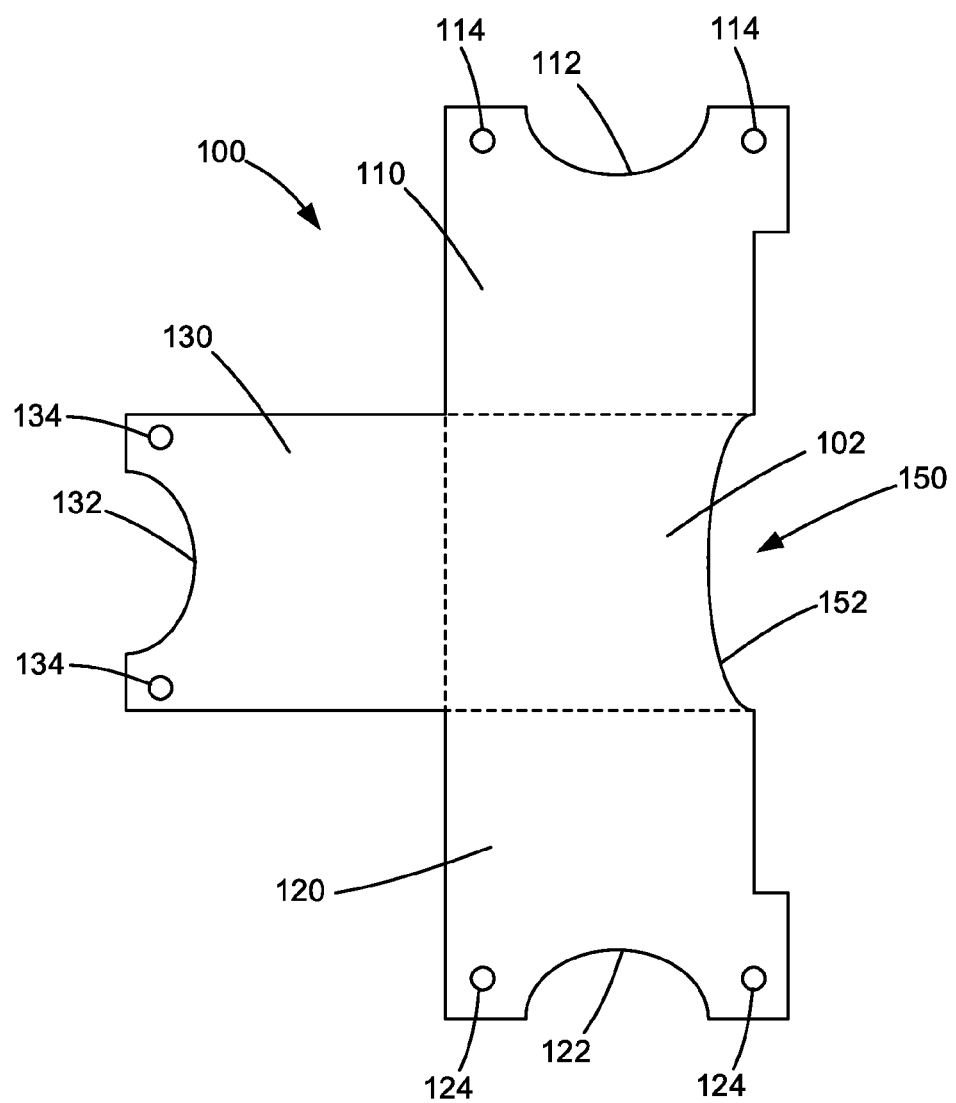
FIG. 8 is a schematic view illustrating a portion of the airbag module, according to an alternative configuration.

For example, FIG. 8 illustrates an alternative configuration of the airbag wrap 100 that can be implemented in the airbag module 20. The airbag wrap 100 of FIG. 8 is identical to the airbag wrap illustrated in FIG. 3, and the references numbers and associated descriptions set forth above in regard to FIG. 3 also apply to the FIG. 8 and are not repeated here. The airbag wrap 100 of FIG. 8 can differ from the configuration of FIG. 3 in that it can have a scalloped configuration. According to the scalloped configuration of the airbag wrap 100, a scallop 150 is formed by cutting a curved edge 152 into the central portion 102.

The purpose of the scallop 150 can, for example, be to shape the central portion 102 so that stresses placed on the airbag module cover 64 (see FIG. 2) when opened in response to airbag inflation and deployment are distributed or otherwise directed in a manner that avoids unwanted tearing or fragmentation of the cover. At the same time, the airbag wrap remains effective in biasing the airbag 22 to deploy initially inboard in order to offer protection to the OOP occupant, as described above. Comparing the example configurations of FIGS. 3 and 8, the curved edge 152 of the scallop 150 in FIG. 8 is moved from the corresponding edge in the configuration of FIG. 3 toward the center of the module cover 64. This configuration can help avoid fragmentation of the cover 64 at the edges of the cover by moving the deployment forces toward the center of the cover 64.

Figure 9A:
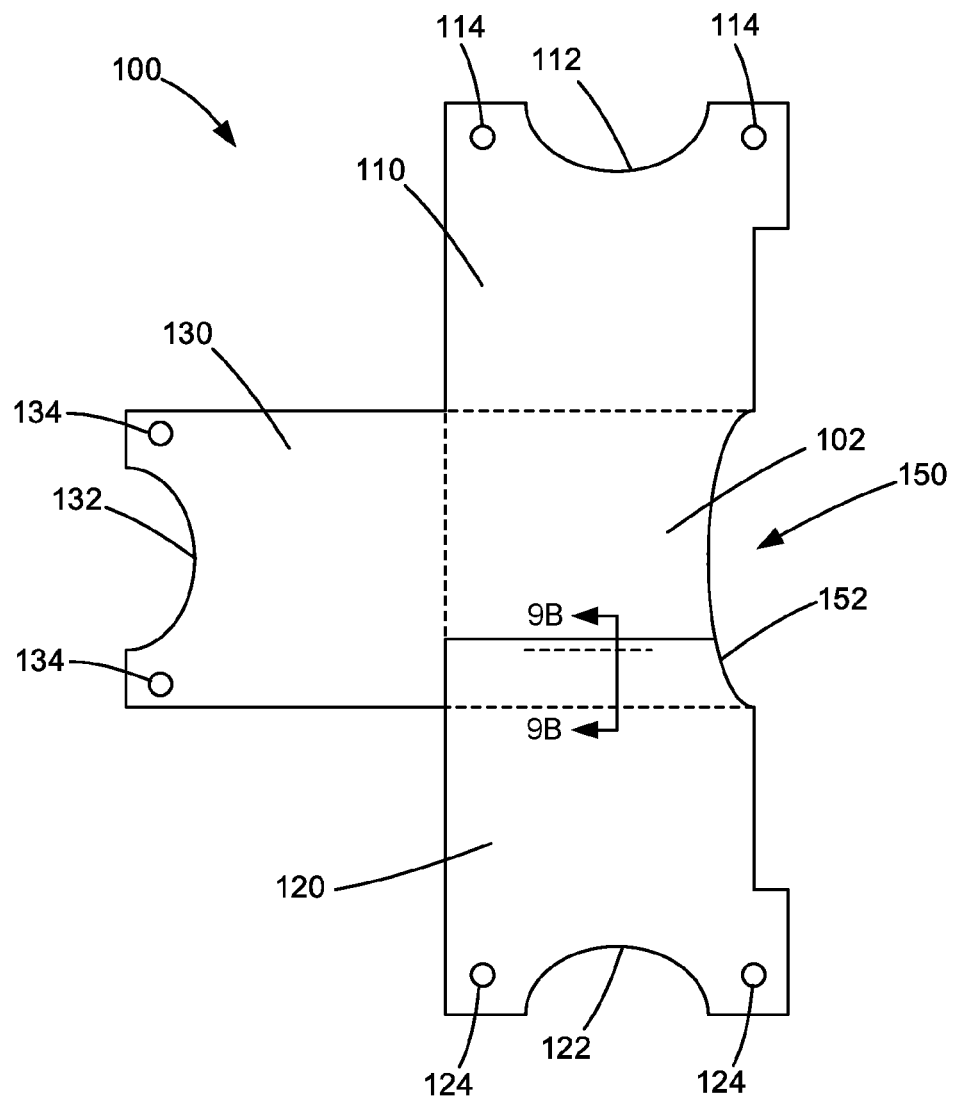
FIGS. 9A-B are schematic views illustrating a portion of the airbag module, according to another alternative configuration.
Figure 9B:
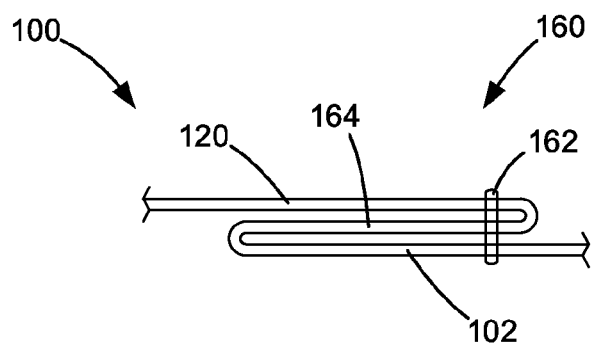

As another example, FIGS. 9A-B illustrate another alternative configuration of the airbag wrap 100 that can be implemented in the airbag module 20. The airbag wrap 100 of FIGS. 9A-B can be identical either to the airbag wrap illustrated in FIG. 3 or the airbag wrap illustrated in FIG. 8, and the references numbers and associated descriptions set forth above in regard to FIGS. 3 and 8 also apply to the configuration of FIGS. 9A-B and are not repeated here. The airbag wrap 100 illustrated in FIGS. 9A-B has the scalloped configuration of FIG. 8 and therefore includes the scallop 150 and scalloped edge 152 (shown in FIG. 9A only). The airbag wrap 100 illustrated in FIGS. 9A-B alternatively could have the non-scalloped configuration of FIG. 3.

The airbag wrap 100 of FIGS. 9A-B differs from the configurations of FIGS. 3 and 8 in that it includes a pleat 160 for helping to control deployment of the airbag. The pleat 160 is formed by a portion of the lower portion 120 of the airbag wrap 100 that is folded over onto the central portion 102 of the wrap. This places a pleated portion 164 of the lower portion 102 between the remainder of the lower portion and the central portion 102. The pleat 160 includes a tear stitch 162 that extends through overlying portions of the airbag wrap 100, i.e., the central portion 102, the lower portion 120, and the pleated portion 164 to secure those portions in the pleated condition illustrated in the figures. In doing so, the pleat 160 reduces the size of the deployment opening 106, specifically the portion of the deployment opening adjacent to the location of the pleat, i.e., a lower portion of the deployment opening.

The tear stitching 162 is rupturable in response to airbag deployment forces acting on the airbag wrap 100. As the airbag 22 inflates and deploys though the deployment opening 106, which is reduced in size due to the pleat 160, the deploying airbag acts on the airbag wrap 100, pushing it outward, away from the steering yoke 50, causing tension to build on the pleat 160. This tension pulls at the tear stitching 162, which eventually ruptures and allows the pleat 160 to unfold. When this occurs, the size of the deployment opening 106 increases.

During initial inflation and deployment of the airbag 22, the pleat 160 restricts the degree to which the lower portion 120 of the airbag wrap 100 moves or opens. As a result of the pleat 160 being formed in the lower portion 120 of the airbag wrap 100, the opening-up of the deployment opening 106 (see, e.g., FIGS. 4, 5, 7B) at the lower portion of the opening is limited. As a result, initial deployment of the portion of the airbag 22 (i.e., a lower portion of the airbag) that deploys through the lower portion of the deployment opening 106, is inhibited. Once the tear strength of the tear stitching 162 is overcome by the deployment forces acting on the airbag wrap 100, the stitching releases, the deployment opening 106 opens fully, and the lower portions of the airbag 22 can deploy without this initial inhibition.

Because the lower portion of the airbag 22 can be associated with a lower portion of the occupant's head 40, e.g., the chin, initially inhibiting this portion of the airbag can be advantageous, especially in the case of the aforementioned OOP occupant. Moving the initial deployment forces away from this area can further the degree to which the energy used to initially deploy the airbag is not transferred to the occupant's head 40. The pleat can produce an initial deployment trajectory of the airbag 22 that is both lateral and upward with respect to the occupant's head 40, especially in the case of an OOP occupant. The pleat 160 opens and airbag deployment continue, with the deployment energy transferred from the airbag 22 to the occupant's head 40 being greatly reduced.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for helping to protect a driver side occupant of a vehicle having a steering yoke, comprising:
   an airbag mounted to the steering yoke; and
   an airbag wrap surrounding the airbag mounted to the steering yoke and configured to bias the airbag to deploy in a direction transverse to a steering axis of the steering yoke.

2. The apparatus recited in claim 1, wherein the airbag wrap comprises a deployment opening and a pleat formed in the airbag wrap.

3. The apparatus recited in claim 2, wherein the pleat is secured with a tear stitch.

4. The apparatus recited in claim 3, wherein the tear stitch is configured to rupture in response to deployment of the airbag.

5. The apparatus recited in claim 4, wherein the pleat is configured to unfold in response to rupture of the tear stitch.

6. The apparatus recited in claim 4, wherein the deployment opening is configured to increase in size in response to rupture of the tear stitch.

7. The apparatus recited in claim 2, wherein the airbag wrap is configured so that the bias exerted on the deploying airbag diminishes as the airbag deploys in an initial deployment direction through the deployment opening to a point where pressurization of the airbag overcomes the bias and the airbag moves back toward the steering axis to a normally deployed condition.

8. The apparatus recited in claim 2, wherein the airbag wrap is further configured to restrict airbag movement in directions other than an initial deployment direction so that the airbag wrap biases the airbag to deploy through the deployment opening in the initial deployment direction.

9. The apparatus recited in claim 2, wherein the airbag wrap is configured so that the deployment opening is at least partially defined by an edge of the wrap configured to distribute at least a portion of initial airbag deployment forces away from an edge of a cover behind which the airbag and airbag wrap are stored.

10. The apparatus recited in claim 9, wherein the edge of the wrap at least partially defining the deployment opening comprises a scalloped edge.

11. The apparatus recited in claim 9, wherein the scalloped edge comprises an edge that is curved inward toward a center portion of the cover.

12. The apparatus recited in claim 2, wherein the airbag and airbag wrap are components of an airbag module, wherein the airbag module further comprises an inflator for inflating the airbag, and a retainer to which the inflator, airbag, and airbag wrap are secured, wherein the retainer is configured to be connected to the steering yoke to mount the airbag module on the steering yoke.

13. The apparatus recited in claim 12, wherein the airbag wrap comprises:
   a central portion configured to cover the airbag;
   a first wrap portion that extends from the central portion in a first direction, wraps around the airbag, inflator, and retainer, and is secured to a rear of the retainer;
   a second wrap portion that extends from the central portion in a second direction, opposite the first direction, wraps around the airbag, inflator, and retainer, and is secured to the rear of the retainer;
   a third wrap portion that extends from the central portion in a third direction, transverse to both the first and second directions, wraps around the airbag, inflator, and retainer, and is secured to the rear of the retainer.

14. The apparatus recited in claim 13, wherein the third direction is opposite an initial deployment direction of the airbag.

15. The apparatus recited in claim 13, wherein the central portion and the first, second, and third wrap portions define the deployment opening and restrict airbag movement in directions other than an initial deployment direction due to their respective connections to the rear of the retainer.

16. The apparatus recited in claim 13, wherein the second wrap portion is folded to form the pleat, and wherein the tear stitching extends through the pleat and connects the folded portions of the second wrap portion to the central portion.

17. The apparatus recited in claim 13, further comprising fastener studs that extend through the retainer and through fastener receiving openings in end portions of the first, second, and third wrap portions to secure the first, second, and third wrap portions to the retainer.

18. The apparatus recited in claim 17, wherein the fastener studs also secure the airbag and the inflator to the retainer.

19. The apparatus recited in claim 1, wherein the airbag has a generally circular, pillow shaped configuration, wherein the airbag, in a normally deployed position, is generally centered on the steering axis.

20. The apparatus recited in claim 1, wherein an initial deployment direction of the airbag is configured to be a lateral direction with respect to the vehicle.

21. The apparatus recited in claim 1, wherein an initial deployment direction of the airbag is configured to be a laterally inboard direction with respect to the vehicle.

22. The apparatus recited in claim 1, wherein an initial deployment direction of the airbag is configured to be lateral of an area on the steering yoke where an out-of-position occupant's head can rest.

23. The apparatus recited in claim 22, wherein the airbag is configured so that deployment in the initial deployment direction directs deployment energy of the airbag away from an area on the steering yoke where an out-of-position occupant's head can rest.

24. The apparatus recited in claim 23, wherein the airbag is configured so that deployment in the initial deployment direction causes an initially low deployment energy to be applied to the OOP occupant's head, causing an initial low energy movement of the OOP occupant's head away from the steering yoke.

25. The apparatus recited in claim 23, wherein the airbag is configured to move back toward the steering axis to a normally deployed condition, which further moves the OOP occupant's head away from the steering yoke after the initial deployment energy is expended.

26. A vehicle safety system comprising the airbag module recited in claim 12.

* * * * *